United States Patent
Liang

(10) Patent No.: US 12,368,290 B2
(45) Date of Patent: Jul. 22, 2025

(54) JUNCTION BOX WITH SCREW-FREE ROTARY FLIP COVER USED FOR LIGHTING DEVICE

(71) Applicant: Jianhua Liang, Guangning (CN)

(72) Inventor: Jianhua Liang, Guangning (CN)

(*) Notice: Subject to any disclaimer, the term of this patent is extended or adjusted under 35 U.S.C. 154(b) by 93 days.

(21) Appl. No.: 18/117,492

(22) Filed: Mar. 6, 2023

(65) Prior Publication Data

US 2023/0283055 A1 Sep. 7, 2023

(30) Foreign Application Priority Data

Dec. 27, 2022 (CN) .......................... 202211686231.3

(51) Int. Cl.
*H02G 3/14* (2006.01)
*H02G 3/08* (2006.01)

(52) U.S. Cl.
CPC ............... *H02G 3/14* (2013.01); *H02G 3/081* (2013.01)

(58) Field of Classification Search
CPC .......... H02G 3/08; H02G 3/081; H02G 3/083; H02G 3/085; H02G 3/086; H02G 3/14
USPC ................... 220/3.2, 3.8, 3.92, 3.94
See application file for complete search history.

(56) References Cited

U.S. PATENT DOCUMENTS

| | | | | |
|---|---|---|---|---|
| 1,396,434 | A * | 11/1921 | Horton ...................... | H02G 3/14 220/524 |
| 6,247,590 | B1 * | 6/2001 | Baker ................... | B65D 75/366 206/335 |
| 7,626,121 | B1 * | 12/2009 | Cleghorn ................. | H02G 3/14 174/67 |
| 7,825,336 | B2 * | 11/2010 | Peck ....................... | H02G 3/121 174/64 |
| 9,035,175 | B2 * | 5/2015 | Korcz ....................... | H02G 3/12 439/535 |
| 2004/0094318 | A1 | 5/2004 | Koessler | |
| 2013/0010450 | A1 | 1/2013 | Xiao et al. | |
| 2014/0311793 | A1 | 10/2014 | Kaneko et al. | |
| 2022/0190575 | A1 * | 6/2022 | Wen ........................ | H02G 3/085 |

FOREIGN PATENT DOCUMENTS

CA 3045564 A1 * 12/2019 ............. F16M 13/02

* cited by examiner

*Primary Examiner* — Nathan J Jenness
*Assistant Examiner* — Madison L Poos
(74) *Attorney, Agent, or Firm* — Bayramoglu Law Offices LLC

(57) ABSTRACT

Provided is a junction box with a screw-free rotary flip cover used for a lighting device. The junction box comprises a junction box main body, a first cover body and a second cover body. The junction box main body is provided with a first accommodating space and a second accommodating space. The first cover body of the junction box is fixedly connected with the junction box main body and covers the first accommodating space. The second cover body is rotatably connected with the first cover body. When the second cover body rotates relative to the first cover body, the second cover body can cover or open the second accommodating space. Electrical components are mounted in the first accommodating space and the second accommodating space.

8 Claims, 4 Drawing Sheets

JUNCTION BOX WITH SCREW-FREE ROTARY FLIP COVER USED FOR LIGHTING DEVICE

TECHNICAL FIELD

The present disclosure relates to the field of junction boxes, in particular to a junction box with a screw-free rotary flip cover used for a lighting device.

BACKGROUND

Junction boxes are generally used for lighting devices. As one of common auxiliary materials for circuits, the junction box is used for the connection and transition of wires and electrical components, and also plays a protective role in the wires and electrical components. In order to reduce screws and facilitate the installation, in the existing junction box, the junction box cover and the junction box main body are connected by buckles. However, the junction box cover needs to be removed when the junction box in buckled connection is maintained, resulting in inconvenience in connection and lose of the junction box cover. In view of this, a junction box with a screw-free rotary flip cover used for a lighting device is researched and developed.

SUMMARY

The purpose of the present disclosure is to provide a junction box with a screw-free rotary flip cover used for a lighting device so as to solve the problem proposed in the background technology.

Provided is a junction box with a screw-free rotary flip cover used for a lighting device. The junction box includes a junction box main body, a first cover body and a second cover body. The junction box main body is provided with a first accommodating space and a second accommodating space. The first cover body of the junction box is fixedly connected with the junction box main body and covers the first accommodating space. The second cover body is rotatably connected with the first cover body. When the second cover body rotates relative to the first cover body, the second cover body can cover or open the second accommodating space.

According to some embodiments of the present disclosure, a connecting trough is formed in the side, close to the second cover body, of the first cover body. A connecting part is arranged on the second cover body. The connecting part is rotatably connected into the connecting trough.

According to some embodiments of the present disclosure, the connecting trough is semicircular, the connecting part is circular, and the connecting trough and the connecting part are connected with the junction box main body through a connecting piece.

According to some embodiments of the present disclosure, a first through hole for accommodating the connecting piece is formed in the junction box main body, and a drainage hole is provided below the first through hole.

According to some embodiments of the present disclosure, the junction box main body includes an E-shaped main body, an upper side cover and a lower side cover, and the upper side cover and the lower side cover are fixed by screws.

According to some embodiments of the present disclosure, a screwed connecting trough is formed in the E-shaped main body, and a notch is formed in the side surface of the screwed connecting trough.

According to some embodiments of the present disclosure, clamping parts are arranged on the two sides of the first cover body, and clamping grooves matched with the clamping parts are formed in the E-shaped main body.

According to some embodiments of the present disclosure, the upper side cover and the lower side cover are both provided with a first mounting plate and a second mounting plate. The first mounting plate and the second mounting plate are perpendicular to each other. Bolt mounting holes are formed in the first mounting plate and the second mounting plate. Screw holes are further formed in the first mounting plate.

According to some embodiments of the present disclosure, a baffle is arranged in the second accommodating space, and the position of the baffle can be adjusted.

According to some embodiments of the present disclosure, an adjusting tank is formed in the baffle. The E-shaped main body is provided with a bolt base. The bolt base is connected with an adjusting bolt. The adjusting bolt passes through the adjusting tank to be connected with the bolt base and tightly presses the baffle.

Compared with the prior art, the present disclosure has the following beneficial effects.

Through the arrangement of the first cover body and the second cover body, and the second cover body can rotate relative to the first cover body. When the second cover body rotates relative to the first cover body, the second cover body can cover or open the second accommodating space. Therefore, when the electrical components and wires in the second accommodating space need to be assembled or maintained, only the second cover body needs to be rotated, so that the assembly or maintenance becomes more convenient. In addition, compared with a clip-on cover body in the prior art, the second cover body can be opened or closed by overturning, and is not easy to lose.

Reference signs in the attached figures: 100, junction box main body; 110, first accommodating space; 120, second accommodating space; 130, first through hole; 140, drainage hole; 1100, E-shaped main body; 1110, screwed connecting trough; 1111, notch; 1120, clamping groove; 1130, bolt base; 1200, upper side cover; 1300, lower side cover; 1310, first mounting plate; 1311, bolt mounting hole; 1312, screw hole; 1320, second mounting plate; 200, first cover body; 210, connecting trough; 220, clamping part; 300, second cover body; 310, connecting part; 400, connecting piece; 500, baffle; 510, adjusting tank; and 600, adjusting bolt.

DETAILED DESCRIPTION OF THE EMBODIMENTS

The following clearly and completely describes the technical scheme in the embodiments of the present disclosure with reference to the attached figures in the embodiments of the present disclosure. Apparently, the described embodiments are merely a part rather than all of the embodiments of the present disclosure. Based on the embodiment in the present disclosure, all other embodiments obtained by the ordinary technical staff in the art under the premise of without contributing creative labor belong to the scope protected by the present disclosure.

In the description of the present disclosure, it needs to be illustrated that the indicative direction or position relations of the terms such as "center", "longitudinal", "transverse", "length", "width", "thickness", "upper", "lower", "front", "rear", "left", "right", "vertical", "horizontal", "top", "bottom", "inside", "outside", "clockwise" and "anti-clockwise" are direction or position relations illustrated based on the attached figures, just for facilitating the description of the present disclosure and simplifying the description, but not for indicating or hinting that the indicated device or element must be in a specific direction and is constructed and operated in the specific direction, the terms cannot be understood as the restriction of the present disclosure.

Figure 1:
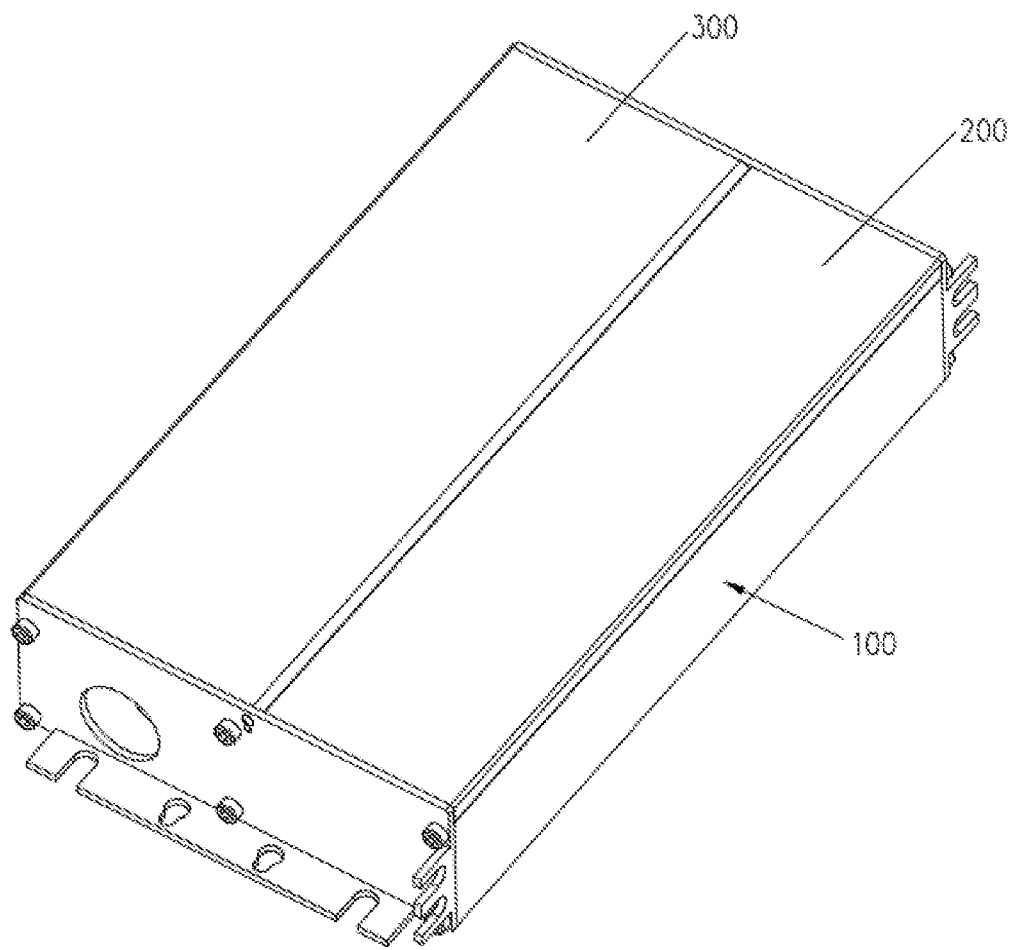
FIG. 1 is an integral structural schematic diagram in one embodiment of the present disclosure.
Figure 2:
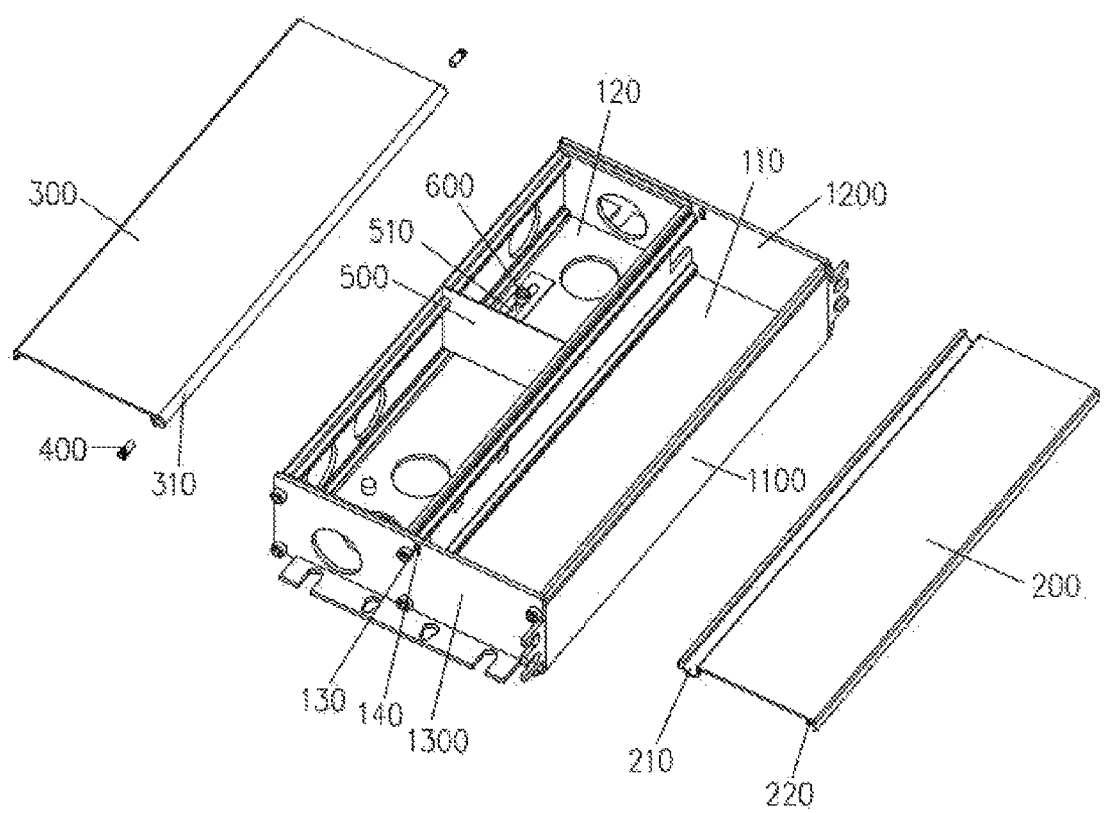
FIG. 2 is an exploded view in one embodiment of the present disclosure.
Figure 3:
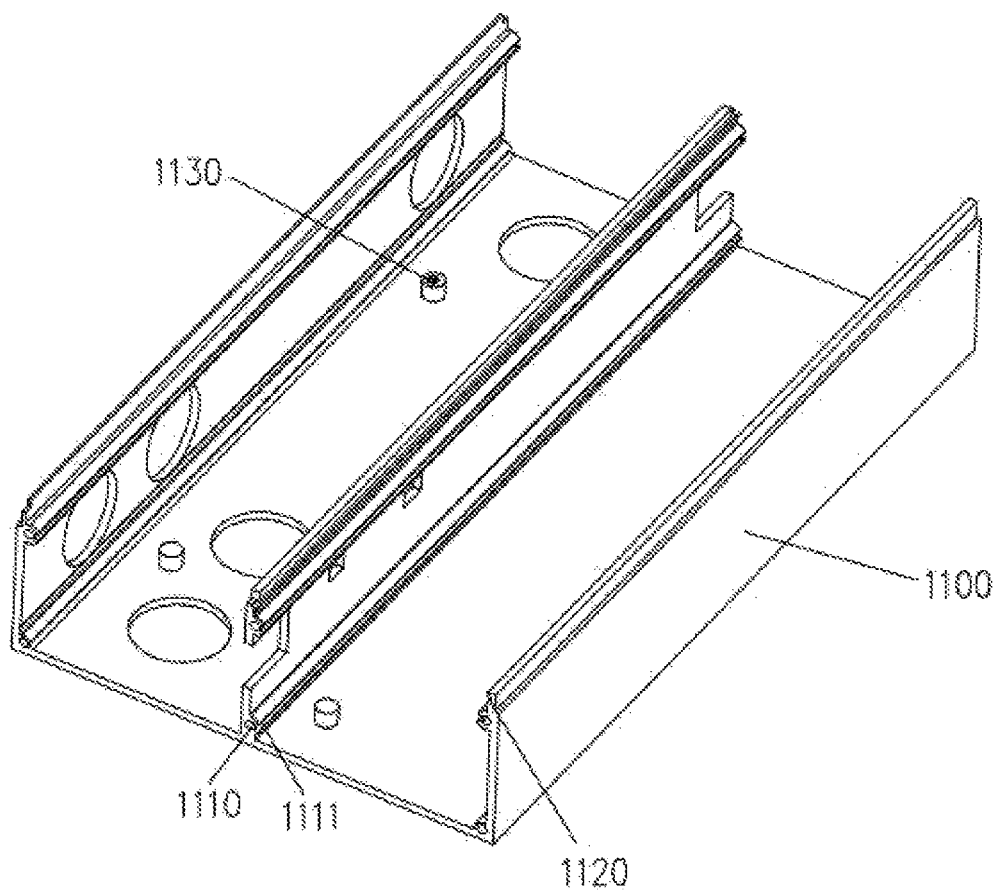
FIG. 3 is a schematic diagram of an E-shaped main body in one embodiment of the present disclosure.
Figure 4:
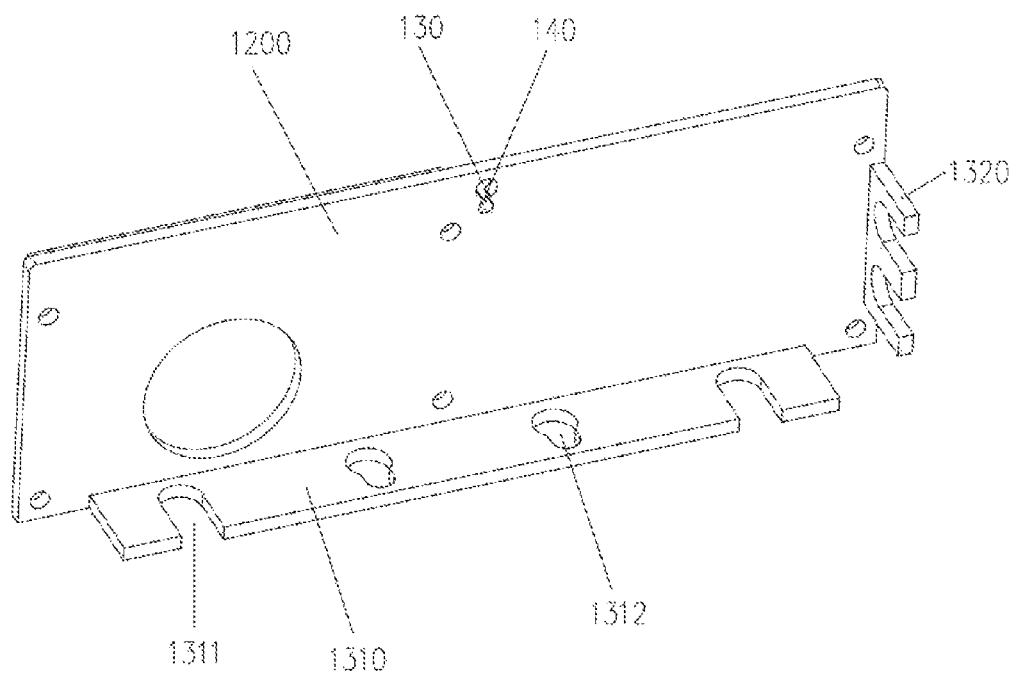
FIG. 4 is a schematic diagram of an upper side cover in one embodiment of the present disclosure.

As shown in FIG. 1 to FIG. 4, provided is a junction box with a screw-free rotary flip cover used for a lighting device. The junction box includes a junction box main body 100, a first cover body 200 and a second cover body 300. The junction box main body 100 is provided with a first accommodating space 110 and a second accommodating space 120. The first cover body 200 of the junction box is fixedly connected with the junction box main body 100 and covers the first accommodating space 110. The second cover body 300 is rotatably connected with the first cover body 200. When the second cover body 300 rotates relative to the first cover body 200, the second cover body 300 can cover or open the second accommodating space 120. Electrical components are mounted in the first accommodating space 110 and the second accommodating space 120. The first accommodating space 110 and the second accommodating space 120 are provided with wiring channels. The second cover body 300 can rotate relative to the first cover body 200. Therefore, when the electrical components and wires in the second accommodating space 120 need to be assembled or maintained, only the second cover body 300 needs to be rotated, so that the assembly or maintenance becomes more convenient. In addition, compared with a clip-on cover body in the prior art, the second cover body 300 can be opened or closed by overturning, and is not easy to lose.

In some modes of execution, a connecting trough 210 is formed in the side, close to the second cover body 300, of the first cover body 200. A connecting part 310 is arranged on the second cover body 300. The connecting part 310 is rotatably connected into the connecting trough 210. Further, the connecting trough 210 is semicircular, the connecting part 310 is circular, and the connecting trough 210 and the connecting part 310 are connected with the junction box main body 100 through a connecting piece 400. The circular connecting part 310 is matched with the semicircular connecting trough 210 to avoid the second cover body 300 from moving left and right relative to the first cover body 200, so that the assembly quality of the junction box main body 100, the first cover body 200 and the second cover body 300 is ensured. In rainy days, through the semicircular connecting trough 210, rainwater can be collected at the bottom of the connecting trough 210 and drains along the connecting trough 210, so that the inside of the junction box keeps dry, and the waterproof performance of the junction box is enhanced. Specifically, a first through hole 130 for accommodating the connecting piece 400 is formed in the junction box main body 100, and a drainage hole 140 is provided below the first through hole 130. The collected rainwater drains from the drainage hole 140.

In some modes of execution, the junction box body 100 may be split, and includes an E-shaped main body 1100, an upper side cover 1200 and a lower side cover 1300. The upper side cover 1200 and the lower side cover 1300 are fixed by screws. The split junction box main body 100 is more convenient to manufacture, so that the production difficulty is reduced.

In some modes of execution, a screwed connecting trough 1110 is formed in the E-shaped main body 1100, and a notch 1111 is formed in the side surface of the screwed connecting trough 1110. The notch 1111 enables the screwed connecting trough 1110 to adapt to screws with different diameters, so that the screwed connecting trough 1110 is higher in adaptability and more convenient to assemble.

In some modes of execution, clamping parts 220 are arranged on the two sides of the first cover body 200, and clamping grooves 1120 matched with the clamping parts 220 are formed in the E-shaped main body 1100. Through the clamping parts 220 and the clamping grooves 1120, the first cover body 200 can be assembled without screw, so that the assembly steps are reduced, and the assembly efficiency is improved. At the same time, the production cost is saved, and the manufacturing cost of the junction box is lower.

In some modes of execution, the upper side cover 1200 and the lower side cover 1300 are both provided with a first mounting plate 1310 and a second mounting plate 1320. The first mounting plate 1310 and the second mounting plate 1320 are perpendicular to each other. Bolt mounting holes 1311 are formed in the first mounting plate 1310 and the second mounting plate 1320. Screw holes 1312 are further formed in the first mounting plate 1310. When the junction box is fixed, according to different mounting environments, the junction box can be fixed by using the first mounting plate 1310 or the second mounting plate 1320. That is, the fixing bolt is driven into the corresponding bolt mounting hole 1311. When the first mounting plate 1310 is used for fixing the junction box, the junction box can be reinforced it by driving screws into the screw holes 1312. Through the first mounting plate 1310 and the second mounting plate 1320, the junction box can adapt to be mounted in two different directions, so that the junction box is more suitable for scenes and higher in adaptability.

In some modes of execution, a baffle 500 is arranged in the second accommodating space 120, and the position of the baffle 500 can be adjusted. The baffle divides the second accommodating space 120 into two separate areas, and the sizes of the two separate areas can be adjusted by adjusting the position of the baffle 500 as required. Specifically, an adjusting tank 510 is formed in the baffle 500. The E-shaped main body 1100 is provided with a bolt base 1130. The bolt base 1130 is connected with an adjusting bolt 600. The adjusting bolt 600 passes through the adjusting tank 510 to be connected with the bolt base 1130 and tightly presses the baffle 500. When the position of the baffle 500 needs to be adjusted, firstly, the adjusting bolt 600 is loosened, then the baffle 500 is adjusted to a predetermined position, and finally the adjusting bolt 600 is tightened. The adjusting steps are very simple and convenient.

The basic principles, principal features and advantages of the present disclosure are shown and described above. Those skilled in the art should understand that the present disclosure is not limited by the above-described embodiments, the above-described embodiments and specification are merely illustrative of the principles of the present disclosure without limiting the present disclosure, various changes and modifications may occur to the present disclosure under the premise of without departing from the spirit and scope of the present disclosure, and these changes and modifications fall within the scope of the present disclosure as claimed. The scope of the present disclosure is defined by the appended claims and equivalents thereof.

What is claimed is:

1. A junction box with a screw-free rotary flip cover used for a lighting device, comprising a junction box main body (100), a first cover body (200) and a second cover body (300), wherein the junction box main body (100) is provided with a first accommodating space (110) and a second accommodating space (120), the first cover body (200) of the junction box is fixedly connected with the junction box main body (100) in a screw-free manner and covers the first accommodating space (110), one side of the second cover body (300) is rotatably connected with the first cover body (200), and another side of the second cover body (300) is connected to the junction box main body (100) in a screw-free manner, and when the second cover body (300) rotates relative to the first cover body (200), the second cover body (300) can cover or open the second accommodating space (120), wherein the junction box main body (100) comprises an E-shaped main body (1100), an upper side cover (1200) and a lower side cover (1300), and the upper side cover (1200) and the lower side cover (1300) are fixed by screws, wherein a screwed connecting trough (1110) is formed in the E-shaped main body (1100), and a notch (1111) is formed in the side surface of the screwed connecting trough (1110).

2. The junction box with a screw-free rotary flip cover used for a lighting device according to claim 1, wherein a connecting trough (210) is formed in the side, close to the second cover body (300), of the first cover body (200), a connecting part (310) is arranged on the second cover body (300), and the connecting part (310) is rotatably connected into the connecting trough (210).

3. The junction box with a screw-free rotary flip cover used for a lighting device according to claim 2, wherein the connecting part (310) is circular, the connecting trough (210) is semicircular so that the connecting part (310) is capable of being arranged in the connecting trough (210) from an upper opening of the connecting trough (210), and the connecting trough (210) and the connecting part (310) are connected with the junction box main body (100) through a connecting piece (400).

4. The junction box with a screw-free rotary flip cover used for a lighting device according to claim 3, wherein a first through hole (130) for accommodating the connecting piece (400) is formed in the junction box main body (100), the connecting piece (400) is configured to pass through the first through hole to enter an inside of the connecting part (310) to prevent the connecting part (310) to move upwards, and a drainage hole (140) is provided below the first through hole (130).

5. The junction box with a screw-free rotary flip cover used for a lighting device according to claim 1, wherein clamping parts (220) are arranged on the two sides of the first cover body (200), and clamping grooves (1120) matched with the clamping parts (220) are formed in the E-shaped main body (1100).

6. The junction box with a screw-free rotary flip cover used for a lighting device according to claim 1, wherein the upper side cover (1200) and the lower side cover (1300) are both provided with a first mounting plate (1310) and a second mounting plate (1320), the first mounting plate (1310) and the second mounting plate (1320) are perpendicular to each other, bolt mounting holes (1311) are formed in the first mounting plate (1310) and the second mounting plate (1320), and screw holes (1312) are further formed in the first mounting plate (1310).

7. The junction box with a screw-free rotary flip cover used for a lighting device according to claim 1, wherein a baffle (500) is arranged in the second accommodating space (120), and the position of the baffle (500) can be adjusted.

8. The junction box with a screw-free rotary flip cover used for a lighting device according to claim 7, wherein an adjusting tank (510) is formed in the baffle (500), the E-shaped main body (1100) is provided with a bolt base (1130), the bolt base (1130) is connected with an adjusting bolt (600), and the adjusting bolt (600) passes through the adjusting tank (510) to be connected with the bolt base (1130) and tightly presses the baffle (500).

* * * * *